United States Patent [19]
Schiff

[11] 3,891,203
[45] June 24, 1975

[54] OFFICE MACHINE INCLUDING FLAT ARTICLE FEEDER

[76] Inventor: Joseph Schiff, 5 Lipski St., Tel Aviv, Israel

[22] Filed: Dec. 27, 1973

[21] Appl. No.: 428,867

[52] U.S. Cl. ................... 271/4; 271/35; 271/207; 271/198
[51] Int. Cl. ................... B65h 29/16; B65h 5/06
[58] Field of Search ......... 271/4, 35, 121, 124, 165, 271/167, 169, 200, 207, 213, 216, 198

[56] References Cited
UNITED STATES PATENTS

| | | | |
|---|---|---|---|
| 1,637,833 | 8/1927 | Mueller | 271/124 |
| 2,233,151 | 2/1941 | Welk | 271/4 |
| 2,632,388 | 3/1953 | Smith | 271/207 |
| 2,995,361 | 8/1961 | Lopez | 271/35 |

*Primary Examiner*—Evon C. Blunk
*Assistant Examiner*—Robert Saifer
*Attorney, Agent, or Firm*—Benjamin J. Barish

[57] ABSTRACT

An office machine including input and output feeders for processing flat articles, such as for automatically labelling envelopes. The output feeder includes a conveyor belt on a conveyor platform for feeding the articles away from the processing station, the conveyor platform being made of a plurality of hinged sections permitting the platform and the conveyor belt to be disposed in either an extended operating position wherein the hinged platform sections are extended for conveying the flat articles from the processing station, or in a folded non-operating position wherein the hinged platform sections are folded to conform to the configuration of, and to serve as a part of, the casing for the machine. The input feeder includes a rotatable web for supporting the stack of flat articles, a rotatable roller for receiving the articles from the bottom of the stack, and a bowed stripper member spring-urged against the roller and assuring a one-by-one feed of the articles.

14 Claims, 3 Drawing Figures

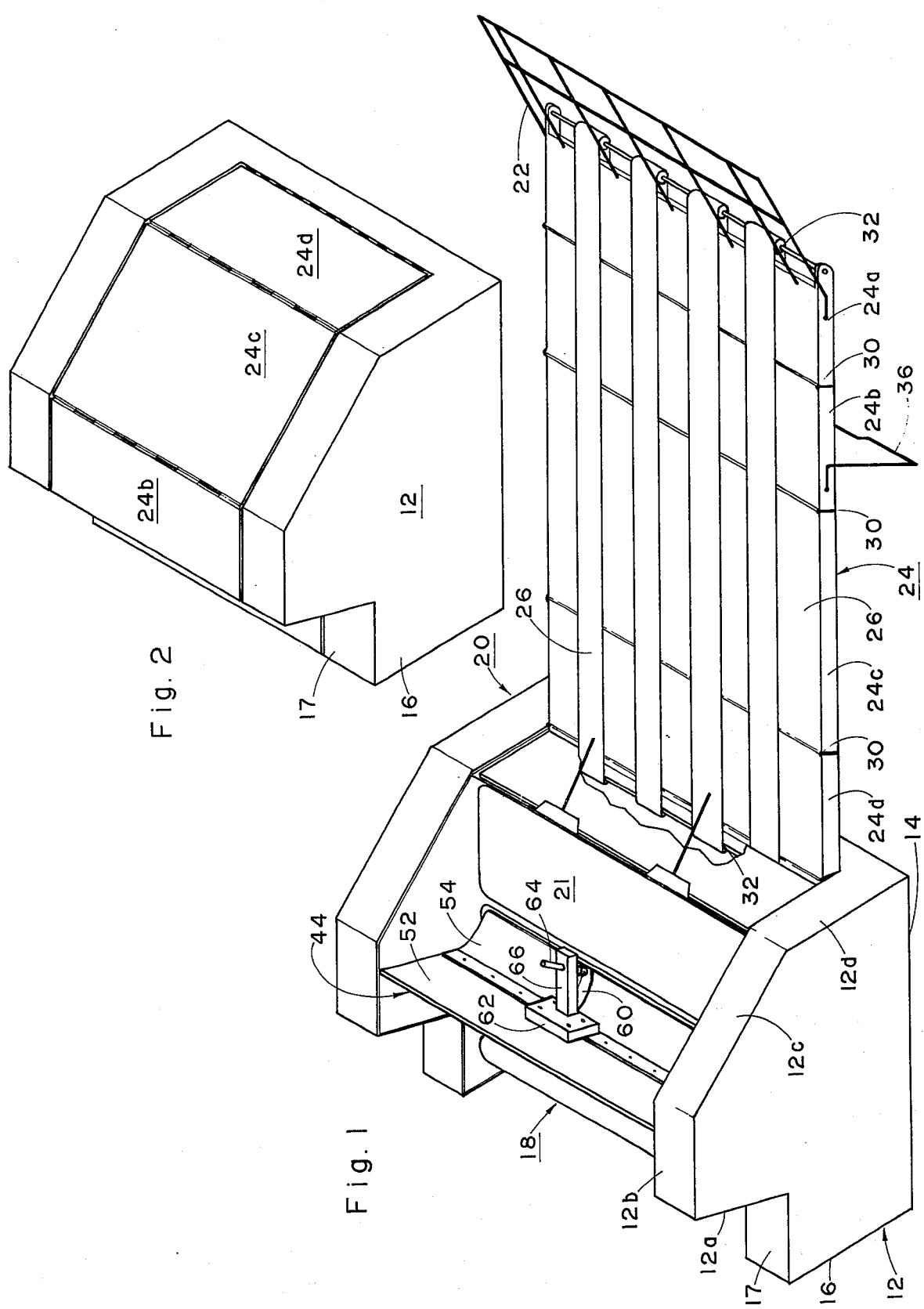

OFFICE MACHINE INCLUDING FLAT ARTICLE FEEDER

BACKGROUND OF THE INVENTION

The present invention relates to office machines of the general type which include flat article feeders, one example of such an office machine being an automatic envelope-labelling machine such as described in my copending U.S. Pat. application Ser. No. 369977 filed June 14, 1973.

There are a large number of office machines in which a plurality of flat articles (e.g. envelopes) are processed (e.g. labelled) and then fed from the processing station within the machine to another station outside of the machine, such as a stacker for stacking the articles in a pile. As a rule such machines are large and bulky, and therefore occupy a considerable amount of office space both in their operating and their non-operating conditions. Further, many machines include feed arrangements which do not permit continuous loading while the machine is in operation, and which can not accommodate at one time flat articles of different dimensions. In addition, the known arrangements used for feeding the flat articles individually to the processing station are generally not entirely satisfactory from the standpoint of simplicity of operation, cost, speed, and reliability in assuring that only one article is fed at a time to the processing station.

BRIEF SUMMARY OF THE INVENTION

An object of the present invention is to provide an office machine incorporating improvements in the above respects.

According to one feature of the present invention, at least one of the feeders, e.g. the output feeder, comprises a conveyor belt and a conveyor platform supporting the belt, the conveyor platform including a plurality of hinged sections permitting the platform and the conveyor belt to be disposed in either an extended operating position wherein the hinged platform sections are extended for conveying the flat articles, or in a folded non-operating position wherein the hinged platform sections are folded to conform to the configuration of, and to serve as part of, the machine casing, with the conveyor belt disposed within the machine casing.

In the preferred embodiment of the invention described below, the hinged conveyor platform sections are foldable to extend across the top of the machine casing and to cover the processing unit and the other feeder, e.g. the input feeder for feeding the flat articles into the processing station within the casing.

Also in the preferred embodiment described below, the output feeder is the foldable one. It further includes a stacker arm carried on the end hinged section of its conveyor platform for stacking the flat articles fed thereto. The stacker arm may be detached or may be received within the machine casing when the hinged sections of the output feeder conveyor platform are in their folded, non-operating position.

The foregoing features of the invention enable the office machine to be constructed as a very compact unit, in which the conveyor platform is extended during the normal operation of the machine and is then folded to serve as a part of the casing when the machine is not operating. Such a compact arrangement is highly advantageous not only when the machine is in its non-operating condition in the office, but also when it is being transported from one location to another or when it is being stored.

According to another feature of the invention, a novel arrangement is provided for feeding the flat articles into the processing station from the bottom of a stack. This arrangement comprises a rotatable web for supporting the stack of flat articles, a roller disposed in alignment with the rotatable web in the direction of feed of the flat articles, drive means for rotating the roller and web, a rigid plate spaced above the roller, and a stripper member including a flexible strip supported by the rigid plate above the roller with the lower end of the flexible strip resiliently urged against the upper surface of the roller and bowed in the direction of feed of the flat articles. The roller, flexible strip, and rigid plate are of a width at least equal to the width of the flat articles to be fed. In addition, the surface friction of the roller is greater than that of the lower free end of the flexible strip.

According to a further feature, the stripper member comprises a supporting element supporting the upper end of the flexible strip, and a spring finger secured at its upper end to the supporting element, the lower end of the spring finger being bowed and bearing against the flexible strip for urging same against the rotatable member.

Such an arrangement provides a simple, fast, and reliable feeder for feeding flat articles, such as envelopes, one-by-one from the bottom of a stack, enabling continuous loading without the need for adjusting for the width, length or thickness of the flat articles, the flat articles being maintained in a stack without the need for rear or side walls.

BRIEF DESCRIPTION OF THE DRAWINGS

The invention is herein described, by way of example only, with reference to a preferred embodiment thereof illustrated in the drawings, wherein:

FIG. 1 is a perspective view illustrating an office machine constructed in accordance with the invention wherein the output feeder is the foldable one, this feeder being illustrated in its extended or operating position;

FIG. 2 is a perspective view of the machine of FIG. 1 showing the output feeder in its folded or non-operating position.

DESCRIPTION OF THE PREFERRED EMBODIMENT

Figure 3:
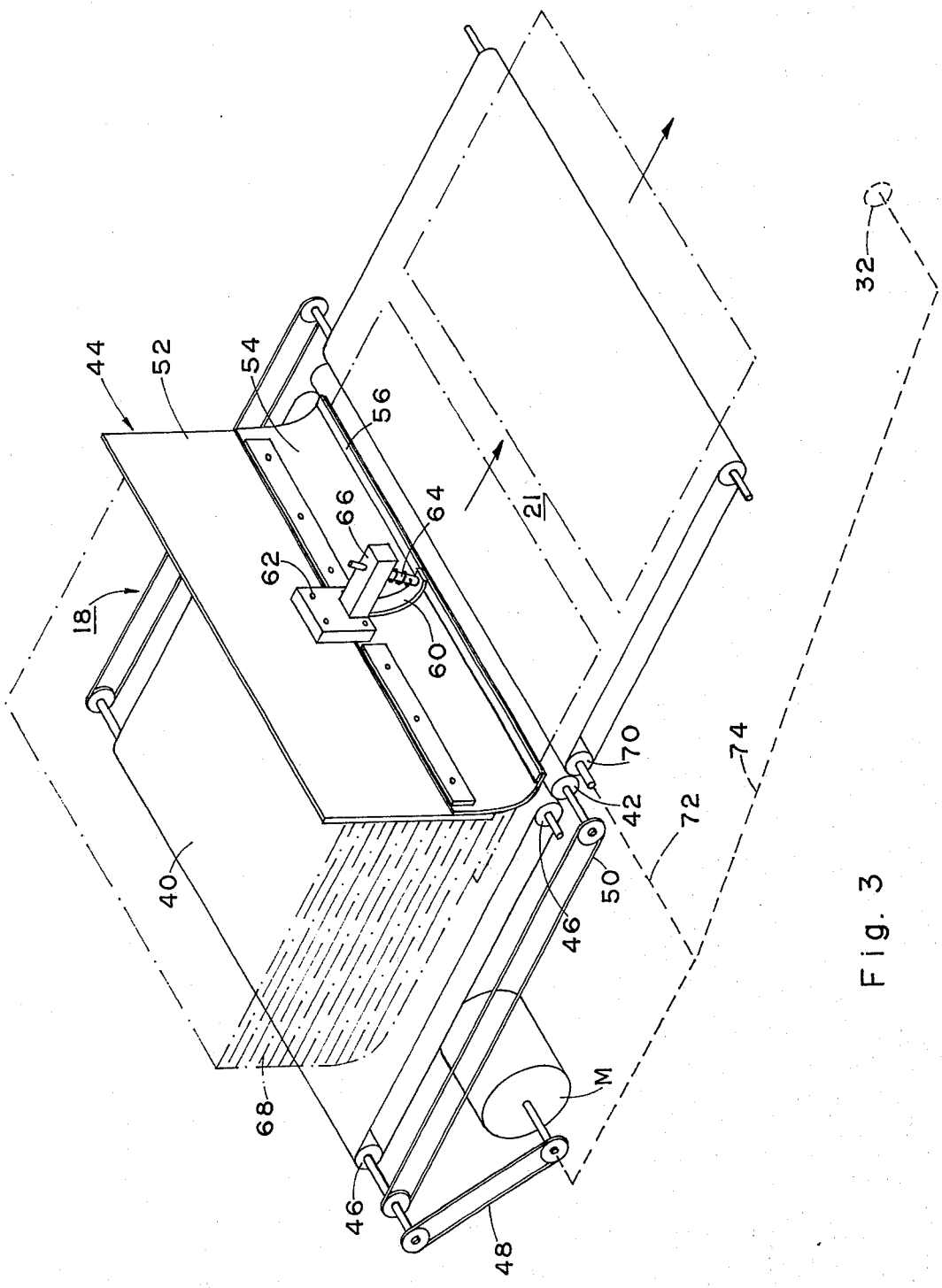
FIG. 3 is an enlarged perspective view illustrating the input feeder in the machine of FIGS. 1 and 2.

The office machine illustrated in the drawings may be an automatic envelope-labelling machine, such as described in my copending U.S. Pat. application Ser. No. 369977, filed June 14, 1973. In such a machine, the flat articles fed into the machine are envelopes which are processed within the machine by having labels applied to them. The so-labelled envelopes are fed out of the machine to a stacker, or to another machine (for example a franking machine) for further processing.

The present invention, however, does not concern the device for processing (i.e., labelling) the flat articles (i.e., the envelopes) within the machine, but rather concerns the input and output feeders for feeding the articles into and out of the machine. The processing unit is therefor not illustrated nor described herein, but reference may be had to my above-cited copending Patent Application for the details of the automatic labelling arrangement that could be used with the present invention. It will also be appreciated that the present invention could be used in other machines, involving the feeding of envelopes or other types of flat articles (e.g. cards, sheets, and the like) into or out of a processing station within the machine.

The machine illustrated in FIG. 1 comprises a casing, generally designated 12, supported on a rectangular base 14. The casing is of a straight-line external configuration, including (from front-to-rear) a front vertical wall 16 joined to a flat horizontal surface 17, another vertically-rising surface 12a, a top horizontal surface 12b, a sloping descending surface 12c, and finally a vertically descending surface 12d.

At the front end of the casing there is provided the input feeder, generally designated 18, for feeding the envelopes to the automatic-labelling unit (not shown) housed within the machine casing, and at the rear end of the machine there is provided the output feeder, generally designated 20, for feeding the stacked envelopes from the labelling unit out of the machine. Between the input and output feeders, there is the processing station wherein the labels are applied to the envelopes. In the machine illustrated in FIG. 1, the processing station includes a flat moving web 21 supporting the envelopes as the labels are applied to them by an automatic label applicator (not shown).

The input feeder 18 is illustrated in FIG. 3 and is described more particularly below.

Output feeder 20 carries, at its outer extremity, a pivotable, inclined wire framework or bail 22 which stacks the labelled envelopes into a pile as they are fed out of the machine.

The output feeder 20 further includes a conveyor platform, generally designated 24, and a plurality of conveyor belts 26 supported on the platform.

Conveyor platform 24 is constituted of a plurality of separate sections connected together by hinges which permit the sections to be disposed in the extended operating position illustrated in FIG. 1, or in a folded non-operating position as shown in FIG. 2. In the latter position, the sections are folded to conform to the external configuration of, and to serve as part of, the machine casing.

Thus, as shown in FIG. 1, conveyor platform 24 is constituted of four sections 24a–24d all connected together by hinges 30 between adjacent sections. The innermost section 24a, and the outermost section 24d carry the end rollers 32 for the conveyor belts 26. A pivotable wire bail 36 is carried by one of the platform sections (24b) for supporting the conveyor platform in the extended, operating position illustrated in FIG. 1.

Bail 36 thus serves as feet for supporting the extended platform, but may also be used as a handle to be grasped by the operator when folding the conveyor platform to its closed, non-operating condition.

During the normal use of the machine, conveyor platform 24 is disposed in the extended position illustrated in FIG. 1, so as to receive the processed flat articles (e.g. labelled envelopes) from the processing station (21), and for conveying them to stacker bail 22 where the envelopes are stacked in a pile. When the machine is not in use, platform sections 24 may be folded into the position illustrated in FIG. 2. For this purpose, the dimensions of platform sections 24a–24d correspond to those of surfaces 12a–12d, respectively, of the machine casing, so that in this folded condition, the sections conform to the external shape of the machine casing 12 and serve as a part of it. In this folded condition, the conveyor belts 26 and stacker bail 22 are disposed within the casing, and the underface of the conveyor platform sections form the outer face of that portion of the machine casing.

Thus, when the machine is not in use, the output feeder 20 may be folded with respect to the machine casing so as to form a very compact unit that takes very little space when non-operating, stored, or being transported to another location.

The input feeder 18 for feeding the flat articles into the machine is best seen in FIG. 3. It includes a rotatable web 40 for supporting the stack of flat articles, a roller 42 immediately rearwardly of and in alignment with web 40, and a stripper member 44 for assuring that only one article is fed at a time from the bottom of the stack. Web 40, roller 42 and stripper member 44 are of a width at least equal to that of the flat articles (e.g. envelopes), but preferably greater than the length of the flat articles so that they can be fed width-wise as well as length-wise into the machine.

Web 40 forms a closed loop, its ends being supported by a pair of rollers 46. The latter rollers are driven by motor M via belt 48; and feed roller 42 is driven by the motor via belt 50. The direction of rotation of the foregoing transmission is such as to move the top run of web 40 and the upper surface of roller 42 towards stripper member 44.

Stripper member 44 comprises a rigid plate 52 fixed to the machine frame for example, and supporting at its lower end a strip 54 of flexible or bowable plastic or the like. Flexible strip 54 is attached only at its upper edge to plate 52, its lower edge 56 freely resting on roller 42. Strip 54 is flexed such that its lower end is bowed in the direction of feed of the flat articles, as shown in FIG. 3, with its lower edge 56 being urged against the surface of roller 42 either by the inherent elasticity of the strip, or preferably by the provision of a spring finger 60.

Finger 60 is secured at its upper end to plate 52 by a mounting block 62, and its lower end is bowed to press the lower edge 56 of strip 54 against roller 42, as shown in FIG. 3. Preferably, the lower edge of flexible strip 54 is lined with a reinforcing strip.

The inherent resilience of spring finger 60 may be used for urgeing the lower edge 56 of strip 54 against roller 42, but preferably a spring-urged pressure member 64 adjustably mounted on a mounting block 66 is provided for this purpose.

The surface friction of roller 42 is greater than that of the lower free end 56 of flexible strip 54 (or of its liner if used) whereby the flexible strip assures that only one flat article (e.g. envelope) is fed at a time by the input feeder into the machine.

As an example, the outer surface of roller 42 may be of sponge-rubber of high friction, and the lower edge 56 of strip 54 (or of the liner if used) may be of a plastic such as nylon.

The rigid plate 52, which may be of hard plastic or metal, together with web 40, maintains the envelopes shown in broken lines at 68 in FIG. 3, in a neat stack and permits the envelopes to be continuously loaded during the operation of the machine. Thus, plate 52 and web 40 act as the supply receptacle and require neither a rear wall nor side walls for the stack. Preferably, web 40 is at a downward incline to the horizontal plane, this arrangement further assuring that the envelopes are maintained in a neat stack during the rotation of the web with the leading edges of the envelopes being continuously aligned for feeding from the bottom of the stack between roller 42 and the bottom edge 56 of flexible strip 54. This simple feeding arrangement thus also acts somewhat like a jogger.

Web 21 at the processing station is driven by motor M via rollers 70 and a transmission, schematically indicated by broken lines 72, from motor M (FIG. 3). Likewise output feeder belts 26 are driven by motor M as shown by the broken-line connection 74 from the motor to the belt rollers 32.

The operation of the machine illustrated in the drawings will be apparent from the above description. Thus, when the machine is not in use, the output feeder 20 is in its folded condition as shown in FIG. 2, wherein the conveyor platform sections 24 are folded on their hinges 30 to conform to the external configuration of the machine casing 12 and to serve as part of the machine casing. In this folded condition, the machine forms a neat and compact unit, with the output feeder belts 26 as well as the stacker bail 22 all disposed within the machine casing.

When the machine is to be used, the output feeder 20 is extended to its operating condition, by opening the platform sections 24 on their respective hinges 30, so that the platform and conveyor belts 26 are disposed in a straight line to receive the articles fed from the processing station (21) of the machine. When the articles are to be stacked, bail 22 is pivoted to its upper inclined position as shown in FIG. 1, so that it intercepts and stacks the articles as they arrive at the end of the conveyor belts 26.

The articles, namely unlabelled envelopes 68, are fed into the machine via input feeder 18 by stacking them on rotatable web 40. As the web and its feeding roller 42 are rotated by motor M, the articles are fed from the bottom of the stack between roller 42 and the lower edge of flexible strip 54. The arrangement illustrated particularly in FIG. 3, including the fact that the surface friction of roller 42 is greater than that of the lower free end of flexible strip 54, assures that only one article is fed at a time.

Stacker-bail 22 is pivotably mounted, or it may be removably attached, so that it can be disabled whenever the output of the machine is to be fed directly to another machine rather than being stacked. Removable turn-around guides (not shown) can be provided to turn the exiting envelopes from a width-wise to a length-wise direction, if desired, for example where the succeeding machine is a franking machine.

The linear speed of the output feeder belts 26 would normally be less than the linear speed of web 21, so that the exiting articles (labelled envelopes) will overlap as they arrive at stacker bail 22. When the articles are not to be stacked, but are to be fed to another machine for further processing, such as a franking machine, the linear speed of the output feeder belts 26 would be the same or even greater than that of web 21 to prevent overlap of the articles as they are fed out of the machine by the output feeder.

To terminate the feeding of the articles, the rotation web 40 is terminated, which can be effected either by stopping motor M, or preferably by controlling a clutch (not shown).

Since the machine illustrated forms a very compact unit when in its non-operating condition, it can be supported on a table of substantially the same dimensions as its base 14 (in an edge-top-table arrangement), the table preferably being provided with a slidable or removable panel or rail support for supporting the conveyor platform in its extended, operating position.

While the invention has been described with respect to an arrangement for feeding envelopes into and out of an automatic envelope-labelling machine, it will be appreciated that some or all of the above-described features of the invention could advantageously be used in other machines for feeding other flat articles, such as cards or paper sheets. Also, the foldable feeder arrangement could obviously be used for the input feeder, or for both the input and output feeders.

Further variations, modifications and applications of the illustrated embodiment will be apparent.

What is claimed is:

1. An office machine comprising a machine casing, means within the casing for processing a plurality of flat articles, an input feeder feeding the flat articles from a supply station at the input side of the casing to a processing station within the casing, and an output feeder at the output side of the casing for feeding the articles away from the processing station, at least one of said feeders comprising a conveyor belt and a conveyor platform supporting the belt, said conveyor platform including a plurality of hinged sections permitting the platform and the conveyor belt supported thereby to be disposed in either an extended operating position wherein the hinged platform sections are extended for conveying the flat articles, or in a folded non-operating position wherein the hinged platform sections are folded to conform to the configuration of the machine casing and the conveyor belt disposed within the machine casing.

2. An office machine as defined in claim 1, wherein the hinged conveyor platform sections are foldable to extend across the top of the machine casing and to cover the other feeder.

3. An office machine as defined in claim 1, wherein the output feeder is the foldable one, and wherein the end hinged section of its conveyor platform includes a stacker member for stacking the flat articles fed thereto.

4. An office machine as defined in claim 1, wherein the foldable conveyor platform includes a supporting member on one or more hinged sections for supporting the conveyor platform in its extended operating position.

5. An office machine as defined in claim 1, further including a roller supporting the conveyor belt carried on each of the end hinged sections of the foldable conveyor platform.

6. An office machine as defined in claim 1, wherein the output feeder is the foldable one and wherein the flat articles are supported in a stack in the supply station, said input feeder feeding the articles from the bottom of the stack.

7. An office machine as defined in claim 6, wherein said input feeder comprises a rotatable member, drive means for rotating said rotatable member, and a stripper member including a flexible strip supported above the rotatable member with its lower end resiliently-urged against the upper surface of the rotatable member and bowed in the direction of feed of the flat articles, said rotatable member and flexible strip being of a width at least equal to the width of the flat articles which are fed between the two, the surface friction of the rotatable member being greater than that of the lower free end and of the flexible strip whereby the rotatable member feeds the flat articles from the bottom of the stack and the flexible strip assures that only one flat article is fed at one time by the rotatable member.

8. An office machine as defined in claim 7, wherein said stripper member comprises a supporting element supporting the upper end of the flexible strip, and at least one spring finger secured at its upper end to the supporting element, the lower end of this spring finger being bowed and bearing against the flexible strip for urging same against the rotatable member.

9. An office machine as defined in claim 7, wherein said rotatable member is a roller, and said input feeder further includes a rotatable web at the input side of the roller for supporting the stack of flat articles.

10. An office machine as defined in claim 9, wherein said stripper member includes a rigid plate overlying and spaced above the roller, said plate cooperating with said web in maintaining the articles in a stack during the rotation of the web without the need for rear or side walls.

11. An office machine including a feeder for feeding flat articles from the bottom of a stack, comprising:
 a rotatable web for supporting the stack of flat articles;
 a roller disposed in alignment with the rotatable web at the end thereof in the direction of feed of the flat articles;
 drive means for rotating said roller and web;
 a rigid plate spaced above said roller;
 and a stripper member including a flexible strip supported by said rigid plate above the roller with the lower end of the flexible strip resiliently urged against the upper surface of the roller and bowed in the direction of feed of the flat articles;
 said roller, flexible strip and rigid plate being of a width at least equal to the width of the flat articles to be fed, the surface friction of the roller being greater than that of the lower free end of the flexible strip;
 whereby the machine may be continuously loaded without adjusting for the width, length or thickness of the flat articles, the flat articles being fed one at a time from the bottom of the stack and being maintained in a stack by the rotation of the web without the need for rear or side walls.

12. An office machine as defined in claim 11, wherein said stripper member is secured to the lower end of the rigid plate and includes at least one spring finger secured at its upper end to the rigid plate, the lower end of the spring finger being bowed and bearing against the flexible strip for urging same against the roller.

13. An office machine as defined in claim 12, further including a spring-loaded pressure member bearing against the lower end of the spring finger.

14. An office machine as defined in claim 11 wherein said rotatable web is at a downwardly incline to the horizontal plane in the direction of the rigid plate.

* * * * *